E. G. SCHLEICHER.
RUNNING GEAR FOR VEHICLES.
APPLICATION FILED OCT. 14, 1913.

1,149,153.

Patented Aug. 3, 1915.
2 SHEETS—SHEET 1.

Witnesses:
William Miller
Chris. H. Olmstaedt

Inventor
Edward G. Schleicher
By his Attorneys
Hauff & Warland.

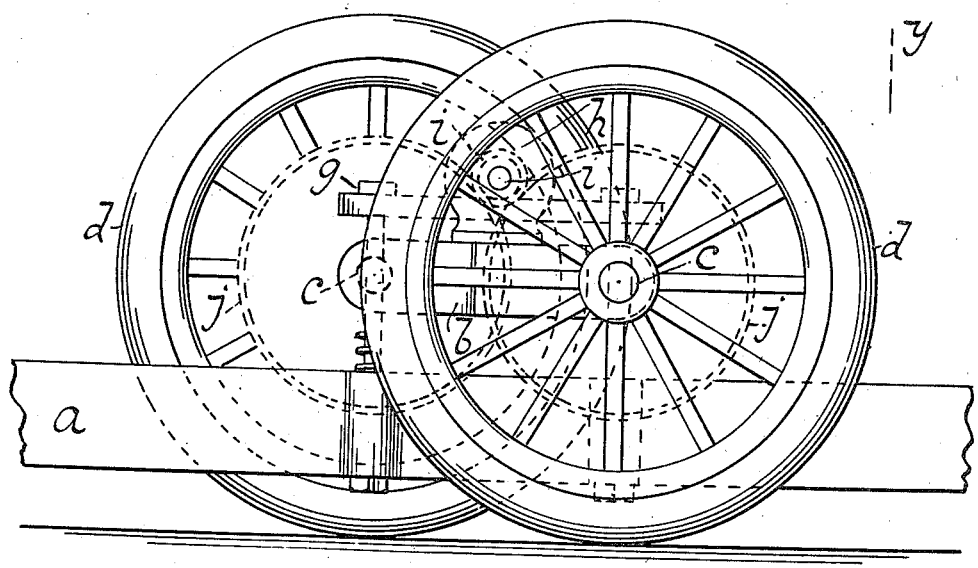
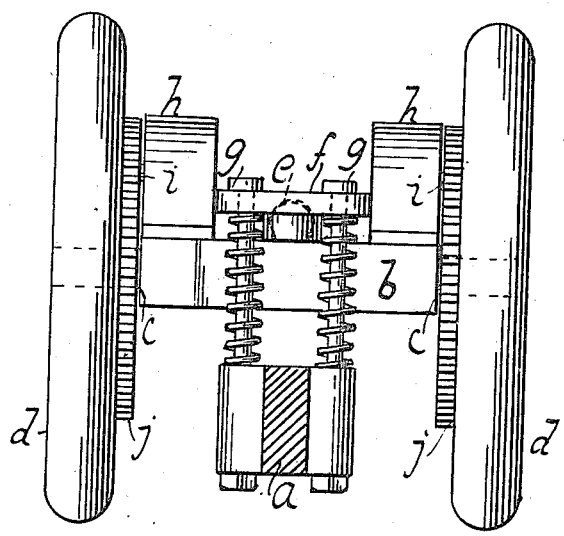

UNITED STATES PATENT OFFICE.

EDWARD G. SCHLEICHER, OF STAMFORD, CONNECTICUT.

RUNNING-GEAR FOR VEHICLES.

1,149,153. Specification of Letters Patent. Patented Aug. 3, 1915.

Application filed October 14, 1913. Serial No. 795,063.

*To all whom it may concern:*

Be it known that I, EDWARD G. SCHLEICHER, a citizen of the United States, residing at Stamford, in the county of Fairfield and State of Connecticut, have invented new and useful Improvements in Running-Gear for Vehicles, of which the following is a specification.

This invention relates to the running gear of vehicles which is especially adapted for use with an automobile or other motor propelled vehicles.

The invention relates particularly to the method of mounting the driving wheels on the trucks. The trucks consist of cranks which are movably connected to the frame. The forward trucks can oscillate horizontally to steer the vehicle and both the forward and rear trucks are designed to rock vertically so as to compensate for the jolts or shocks received by the wheels. There are a plurality of trucks connected to the frame each truck including a double or single crank arranged transversely to the frame with a pair of wheels mounted on the crank and one wheel traveling in advance of the other so as to give perfect balance to the frame. Each wheel is provided with means for driving it, thus giving positive traction and practically eliminating side slip or skidding of the vehicle when on a curve or in turning corners. A pair of trucks are located at each end of the frame, and the forward trucks can be steered in unison.

Figure 1:
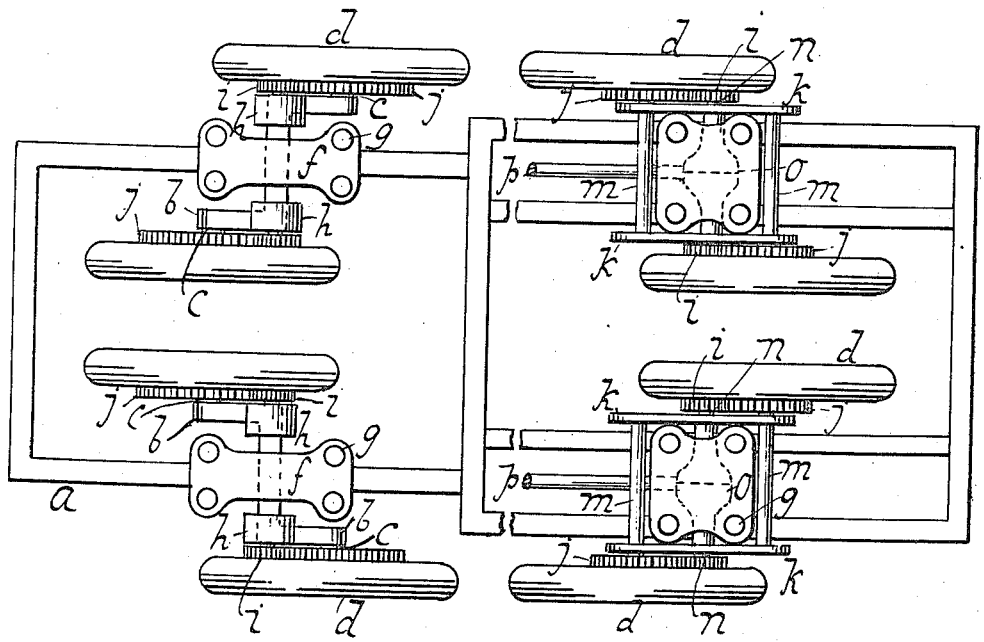
Figure 2:
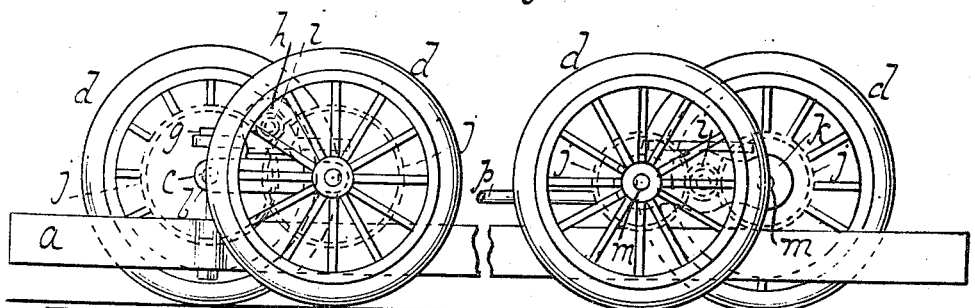

The invention is more fully described in the following specification and claims and illustrated in the accompanying drawings in which:

Figure 1 is a plan view of a vehicle embodying this invention. Fig. 2 is a side elevation of the same. Fig. 3 is a detail side elevation of the forward portion of the vehicle on a larger scale. Fig. 4 is a detail transverse vertical section taken along the line $y$ $y$ of Fig. 3.

In the drawing is shown a frame $a$ of ordinary construction. At the forward portion of the frame are located a pair of horizontally movable trucks, each truck consisting of a crank $b$ formed with a pair of jouranls $c$ each journal having loosely mounted thereon a wheel $d$ normally in contact with the ground. This crank consists of a transverse center axle formed with two lateral arms and having journals projecting from the arms for mounting the wheels. The central portion of the crank is connected to the frame by means of a ball and socket joint $e$ actuating in a bolster $f$. This bolster is secured to the frame by means of bolts $g$ having coiled springs mounted thereon for easing the shocks received by the frame. The crank axle carries two motors $h$ the rotor shafts of which are provided with pinions $i$ to engage gears $j$ fixed to the wheels. Each motor is independent of the other so that when the wheels turn a curve or corner the motors can be driven at different speeds to compensate for the differential velocity of the wheels. The motors and the crank will oscillate together when the wheels are steered.

Each rear truck consists of a double crank having compensating plates $k$ carrying shafts $m$ each shaft has a wheel $d$ loosely mounted on the end thereof. These shafts are opposite to each other in a horizontal longitudinal line and one wheel is positioned in advance of the other. The double crank serves to mount a shaft $n$ having a transmission or differential gear case $o$ as is well known. The differential gears can be actuated by shafts $p$ which are driven by a motor in the usual way. Pinions $i$ on the ends of the shafts $n$ are adapted to engage the said gears $j$ fastened to the wheels.

The trucks when actuated to steer the vehicle will oscillate about the socket joint of the ball bearing $e$. Steering devices of any well known construction may be employed to horizontally oscillate the forward trucks and thereby steer the vehicle in any desired direction.

It will be seen that when a wheel is hit by an obstruction or drops into a rut the compensating crank will swing or rock about its axis and the shock will be absorbed or minimized.

As shown in the drawings there are four trucks each truck carrying two wheels, and each wheel is directly driven so as to give better traction. One of the advantages of having the wheels mounted in advance of each other is that it gives perfect balance to the body and better contact with the ground, thereby avoiding lateral slip of the vehicle.

I claim—

1. In a vehicle the combination with a frame, of vertically rocking and horizontally movable compensating devices including a crank and consisting of a pair of journals one being horizontally in advance of the other, connected transversely to the frame, and a pair of wheels mounted on the journals of the devices.

2. In a motor vehicle the combination with a frame, of vertically rocking and horizontally oscillating compensating devices including a crank and consisting of a pair of journals one being horizontally in advance of the other, connected transversely to the frame, a pair of wheels mounted on the journals of the devices, and means mounted on the devices for driving the wheels.

3. In a motor vehicle the combination with a frame, of vertically rocking and horizontally oscillating compensating devices including a crank and consisting of a pair of journals one being horizontally in advance of the other, transversely connected to the frame, a pair of wheels mounted on the journals of the devices one of the wheels being positioned in advance of the other, and means mounted on the devices for driving the wheels.

4. In a motor vehicle, the combination with a frame, of a pair of trucks at each end of the frame, each truck comprising a crank connected transversely of said frame and independent of one another, a pair of journals or shafts one in advance of the other carried by each crank and adapted to oscillate vertically about the axis of the crank, and a wheel mounted on the opposite end of each journal.

5. In a motor vehicle, the combination with a frame, of a pair of trucks at each end of the frame, each truck comprising a crank connected transversely of said frame and independent of one another, a pair of journals or shafts one in advance of the other carried by each crank and adapted to oscillate vertically about the axis of the crank, a wheel mounted on the opposite end of each journal, and separate driving means for the wheels of each truck.

6. In a motor vehicle, the combination with a frame, of four trucks independent of one another mounted on said fame, said trucks each comprising a crank having a forwardly and a rearwardly projecting arm adapted to oscillate vertically about the axis of the crank, a journal or shaft projecting from each arm in opposite directions, a wheel on each journal or shaft, and separate driving means for the wheels of each truck.

7. In a motor vehicle, the combination with a frame, of a pair of trucks independently mounted on said frame, each of said trucks comprising a double crank having a pair of arms projecting in a plane forwardly and rearwardly of the axis of said crank, a pair of shafts or journals carried by said crank-arms and projecting in opposite directions therefrom, a wheel mounted on the projecting end of each shaft or journal and adapted to oscillate vertically, and a transmission shaft mounted in the axis of the crank.

8. In a motor vehicle, the combination with a frame, of a pair of trucks independently mounted on said frame, each of said trucks comprising a double crank formed with a hollow hub and a pair of arms projecting in a plane forwardly and rearwardly of said hub, a pair of shafts or journals carried by said crank arms and projecting in opposite directions therefrom, a wheel mounted on the projecting end of each shaft or journal and adapted to oscillate vertically about the axis of the crank-hub, a transmission shaft mounted in the hollow hub of the crank, and driving means between the opposite ends of the transmission shaft and each wheel.

In testimony whereof I have hereunto set my hand in the presence of two subscribing witnesses.

EDWARD G. SCHLEICHER.

Witnesses:
CARL F. RÜHLE,
WM. E. WORLAND.